Patented July 2, 1935

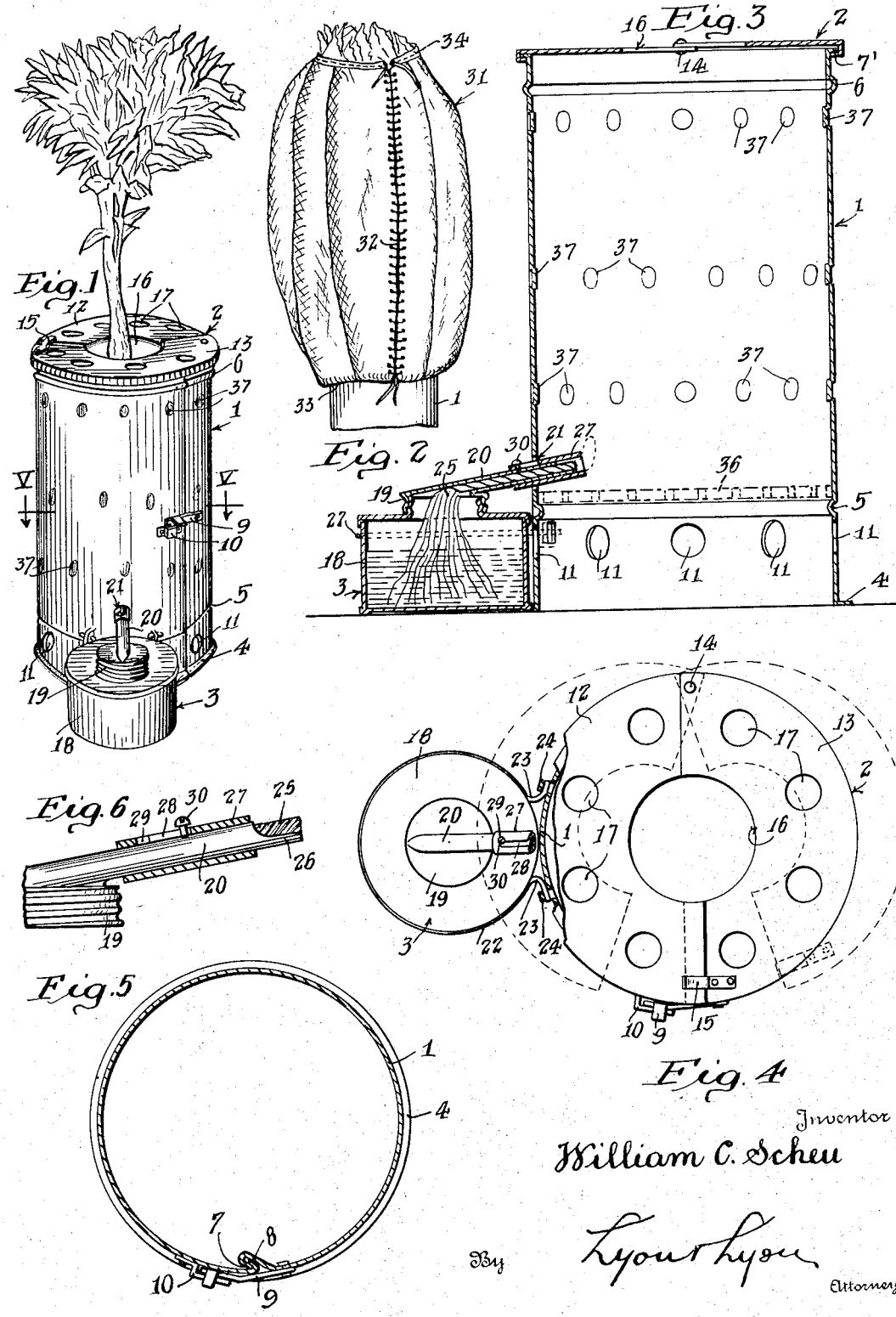
July 2, 1935. W. C. SCHEU 2,006,562
ORCHARD HEATER
Filed July 13, 1934

2,006,562

UNITED STATES PATENT OFFICE 2,006,562

ORCHARD HEATER

William C. Scheu, Upland, Calif., assignor to Scheu Products Company, Ltd., Upland, Calif., a corporation of California Application July 13, 1934, Serial No. 734,953

8 Claims. (Cl. 47—2)

This invention relates broadly to orchard heaters and more particularly to heaters adaptable for individually heating small trees to prevent them from being killed or injured by frost.

A broad object of the invention is to provide an individual small tree heater that is inexpensive to manufacture, is economical in operation and has a high heating efficiency.

Another object is to provide an individual tree heater which can readily be converted into a standard type orchard heater, whereby the heaters may be employed to protect the individual trees themselves from frost while they are small and may later be converted into standard type orchard heaters to heat the orchard as a whole when the trees become too large to be heated individually.

The essential difference between an individual tree heater and the usual type of orchard heater is that the former generates very little heat, but confines that heat to the space immediately surrounding an individual tree whereas the conventional orchard heater generates a great deal of heat and is effective over a large area. The chief advantage of the individual tree heater is its economy in operation. Thus it may employ a small lamp burning alcohol or other liquid fuel whereas the ordinary heater is essentially a stove adapted to burn fuel oil, coke, briquettes, or similar fuels.

Individual tree heaters have been used before and as usually employed consist of a hood or shell of sheet metal adapted to be positioned about the trunk of a tree and form a substantially air-tight enclosure except for small draft openings in the lower part for admitting just sufficient air to support the lamp flame and with a small outlet at the top surrounding the tree trunk to discharge the heated air upwardly along the trunk. Because of the limited amount of air supplied to the hood or shell of such heaters, the air becomes heated to a relatively high temperature. This is objectionable for two reasons; in the first place, the trunk of the tree within the shell is liable to become overheated and, in the second place, the highly heated air discharged immediately about the trunk of the tree tends to rise rapidly up through the center of the tree, thereby failing to protect the outwardly extending branches of the tree from the surrounding cold air.

In accordance with the present invention, I provide an individual tree heater comprising a shell adapted to be positioned about the trunk of the tree and enclose a small flame from a lamp, as in the previously employed heaters. However, my heater differs essentially from those previously employed in that I provide numerous air inlet openings at the bottom of the shell and numerous air outlet openings spaced from the trunk of the tree at the top of the shell. With this construction a relatively large amount of air is introduced into the shell, slightly warmed by the heat of combustion of the flame and discharged from the top of the shell as a slow current of air of substantial cross sectional area which rises slowly into the main body of the tree, thereby displacing the surrounding cold air and affording more complete protection to the tree than was obtained with the prior type heater. Because of the large volume of air circulated through the shell, the temperature within the shell does not rise as high as in the former type heaters and accordingly does not unduly heat the trunk of the tree.

Various specific objects and features of the invention other than those mentioned above will become apparent from the following detailed description which refers to the drawing.

In the drawing:

Fig. 1 is a perspective view of a heater in accordance with the invention, shown positioned about a small tree;

Fig. 2 is an elevation view of the upper portion of a heater shell in accordance with the invention, positioned about a tree and with a fabric enclosure surrounding the main body of the tree for receiving and retaining the warmed air discharged from the heater shell;

Fig. 3 is a vertical sectional view through a heater in accordance with the invention;

Fig. 4 is a plan view of the heater shown in Fig. 3 with portions broken away to disclose certain details of construction;

Fig. 5 is a cross section in the plane V—V of Fig. 1, showing the method of joining the edges of the collapsible shell; and Fig. 6 is a detail view partly in section of a portion of the lamp employed in my heater.

As shown in Fig. 1, my heater comprises a substantially cylindrical sheet metal shell 1 having a cap or lid 2 and a lamp 3. The shell 1 is preferably constructed of sheet metal and is provided with an outwardly extending flange 4 at the lower edge, an inwardly extending rib or corrugation 5 spaced a short distance from the lower edge for supporting a grate for a purpose to be described later, an outwardly extending corrugation 6 adjacent the upper edge for lending rigidity to the shell, and the upper edge is preferably outwardly turned, as shown at 7', to further increase the rigidity. The shell 1 is adapted to be spread apart to be positioned about a tree and then formed into a closed cylinder by interlocking the vertical edges of the shell, as shown in Fig. 5. Thus it will be observed that the two vertical edges 7 and 8, respectively, are bent back on themselves, the edge 8 being bent inwardly and the edge 7 outwardly so that they interengage. After the edges 7 and 8 are interengaged, they are locked in that position by a latch 9, which is riveted to the body of the casing adjacent the edge 7 and engages a strap metal hasp 10 riveted to the body of the casing adjacent the edge 8.

The shell 1 is provided with a plurality of apertures 11 adjacent its lower edge for admitting air to the casing. This air after being heated by the flame from the lamp, to be described later, ascends through the casing and is discharged through the top. In some instances it may be found satisfactory to leave the upper edges of the shell 1 entirely open but in most instances I find it desirable to partially close the upper end by means of the cover 2. This cover 2, as clearly shown in Fig. 4, is formed in two segments 12 and 13, respectively, hinged together at one end by a rivet 14 so that they may be swung apart to position the cover about the trunk of a tree and then closed into the position shown in Fig. 1. The open position of the cover is shown in dotted lines in Fig. 4 and the closed position in full lines.

It will be observed that the edge of the segment 12 adjacent the rivet 14 is positioned below the juxtaposed edge of the segment 13. On the opposite end the edge of the segment 12 is adapted to overlap the edge of segment 13 and be retained in contact with the latter by the extended end of a piece of strap metal 15 riveted to the segment 13. The segments 12 and 13 are cut away at their centers to form a central aperture 16 when the segments are closed together, this aperture 16 surrounding the trunk of the tree but being substantially larger in diameter than the tree trunk so that ample space is left between the edges of the aperture and the tree trunk. The segments 12 and 13 are also provided with numerous apertures 17 spaced outwardly from the central aperture 16 to provide distribution of warm air over a larger area.

The lamp 3 comprises a reservoir 18 adapted to contain a volatile liquid fuel, preferably alcohol, having a screw cap 19 to which is attached a wick tube 20 of such length as to extend laterally substantially beyond the reservoir 18 so that when the reservoir 18 is positioned adjacent the shell 1 the wick tube 20 projects through an aperture 21 provided therefor in the shell 1 into the interior of the shell. Although the reservoir 18 may be merely set on the ground alongside of the shell 1 in the position shown, I have found it desirable to attach the reservoir to the shell. To this end, I provide a bail 22 of such diameter as to encircle the reservoir 18 having its ends bent outwardly, as shown at 23, to engage straps 24 pressed out of the body of the shell 1. The lamp is locked in position by the bail 22 by first swinging the bail upwardly, then placing the lamp in position with the reservoir 18 immediately below the bail and the wick tube 20 projecting through the aperture 21 and then lowering the bail into engagement with the reservoir 18, as shown in Fig. 3.

The wick tube 20 contains a wick 25 of cotton or other absorbent material, which extends down into the tank 18 and conveys the fuel from the tank 18 to the end of the wick tube 20 by capillary attraction. I have found that by reason of the low angle at which the wick tube 20 is inclined, the under edge of the exposed portion of the wick tends to burn or char. To overcome this defect, I therefore extend the under side of the wick tube 20, as shown at 26 in Fig. 6. This prevents the air currents induced by the flame from striking the under side of the wick and charring it.

It is desirable to have some ready means of regulating the size of the flame produced by the lamp 3. To this end, I preferably position a sleeve 27 about the wick tube 20, this sleeve 27 being loosely mounted upon the wick tube so that it can be readily slid back and forth thereon. To limit the movement of the sleeve 27 the latter is provided with a slot 28 having a bayonet recess 29 at its rear end adapted to engage a pin 30 extending from the side of the wick tube 20. In ordinary operation the sleeve 27 is slid rearwardly away from the end of the wick tube 20, as shown in Fig. 6, to light the wick 25, and thereafter slid forwardly the full distance to substantially enclose the wick, as shown in Fig. 3. With the sleeve 27 positioned beyond the end of the wick, as shown in Fig. 3, there is no direct contact of the air with the wick but the heat of the flame is conducted through the sleeve 21 and the wick tube 27 to the end of the wick at a sufficient rate to volatilize the alcohol in the wick and maintain the flame at the end of the sleeve 27. Of course, the size of the flame may be increased by displacing the sleeve 27 rearwardly to expose a portion of the wick.

The heater as described and as shown assembled about a tree in Fig. 1 is satisfactory under most frost conditions and with relatively small trees, especially where there is little or no wind. I have found that because of the relatively large amount of slightly warmed air discharged from the top of the heater, the entire top of the tree may be raised to a temperature many degrees above the temperature of the surrounding air without overheating the trunk of the tree.

However, in regions where dangerously low temperatures may be accompanied by winds it is desirable to employ, in addition to the heater as described, a hood of canvas, burlap or other suitable flexible material adapted to partially or completely enclose the top of the tree and extended down around the shell 1 to positively deliver the warmed air from the shell into the main body of the tree. As shown in Fig. 2, such a hood 31 is preferably provided with a vertical seam 32 so that it may be opened up to facilitate placing of the hood about the tree and thereafter closed substantially air-tight to prevent escape of warm air or ingress of cold air. The lower edge 33 and upper edge 34 are preferably provided with draw strings so that the lower edge can be drawn snugly about the shell 1 of the heater and the upper edge may be contracted to reduce the size of the top opening and limit the escape of the heated air therefrom. If desired, the top may be completely enclosed, particularly if the hood is constructed of open weave material, such as burlap or muslin, since the air supply within the hood from the heater will escape through the interstices of the fabric. The seam 32 may be closed by buttons, snaps, or by an automatic fastener of the "zipper" type, as indicated.

My heater is particularly effective when employed in connection with a hood of the type illustrated in Fig. 2 for the reason that it supplies a large quantity of slightly warmed air to the hood, thereby insuring that practically all parts of the tree within the hood will be uniformly warmed sufficiently to protect the tree without any danger of raising the temperature to a point such that the tree might be injured.

My heater is particularly adapted for use in connection with citrus groves in which the trees themselves may require protection from killing frosts for a year or two, after which it becomes necessary to heat the grove as a whole during the bearing season to prevent injury to the fruit. To this end, it is desirable that the grower be able to employ his individual tree heaters as standard orchard heaters after there is no longer any necessity of individually heating the trees. I therefore prefer to construct the shell 1 of my heater so that it may be employed for burning solid fuel, such as coke or briquettes after it is no longer needed for individually heating the trees. To this end, I provide the inwardly extending rib or corrugation 5 so that a circular grate 36 may be inserted therewithin and supported at a suitable height above the draft apertures 11, to burn solid fuel. It is also desirable in a solid-fuel burner for coke or briquettes that numerous draft outlet apertures be provided in the body of the shell above the grate. To this end, when the shell 1 is originally formed, preferably by a stamping operation, numerous discs 37 are partially punched through the shell 1, sufficient material being left around the edges of the discs 37 to retain them firmly in position and maintain the casing air-tight while at the same time so weakening the metal along the margins of the pressed out portions that they may be readily completely removed by striking them with a hammer. With this construction the shell 1 may be employed as a coke or briquette burner by merely removing the lamp 3, inserting a grate 36 within the casing so that it rests upon the shoulder 5, and knocking out the partially punched out discs 37. The cover 2 may still be employed when burning solid fuel as described to limit the rate of combustion of the fuel.

Although my invention has been disclosed by describing a particular construction, it is obvious that many details of the device as described may be altered without departing from the spirit of the invention and the latter is to be limited only as set forth in the appended claims.

I claim:

1. An orchard heater comprising a casing adapted to be positioned about the trunk of a tree and of substantially larger diameter than the trunk, means for producing a small flame at a point within the space defined between the trunk of the tree and said casing, said casing having air inlet openings in the lower portion thereof and air outlet openings in the upper portion thereof, which inlet and outlet openings have an area far in excess of that necessary to support combustion of said flame, whereby said heater delivers a large volume of air slightly heated by said flame to the space surrounding the trunk of the tree above the heater.

2. An orchard heater as described in claim 1 in which said casing comprises a substantially cylindrical body portion adapted to rest on the ground surrounding the tree trunk and a top closure member having a central aperture for the tree trunk and a plurality of apertures surrounding said central aperture, said apertures constituting said air outlet openings.

3. An orchard heater as described in claim 1 in which said flame producing means comprises a lamp having a reservoir positioned adjacent to and exterior of said casing and a wick tube containing a wick extending laterally from said reservoir and through an aperture in said casing provided therefor into the casing.

4. An orchard heater as described in claim 1 in which said flame producing means comprises a lamp having a reservoir positioned adjacent to and exterior of said casing and a wick tube containing a wick extending laterally from said reservoir and through an aperture in the casing provided therefor into the casing, that portion of said wick tube extending within said casing being inclined at a low angle to the horizontal and having an extending lip on the under side to prevent charring of the wick.

5. An orchard heater as described in claim 1 in which said flame producing means comprises a lamp having a reservoir positioned adjacent to and exterior of said casing and a wick tube extending laterally from said reservoir and through an aperture in the casing provided therefor into the casing, in which said wick tube has a sleeve slidably mounted thereon and adapted to be adjustably extended beyond the end of said wick tube for regulating the size of the flame produced.

6. An orchard heater comprising a shell adapted to be positioned about the trunk of a tree, in combination with a lamp having a reservoir positioned adjacent to and exterior of said casing and a wick tube containing a wick extending laterally from said reservoir and through an aperture in the casing provided therefor into the casing, with means for detachably securing said reservoir to said casing.

7. An orchard heater as described in claim 6 in which said means for detachably securing said reservoir to said casing comprises a bail secured to the wall of said casing and adapted to be swung down and over said reservoir to secure it to the casing, the reservoir being secured against vertical displacement within said bail by engagement of said wick tube with the edges of said aperture.

8. A body member for a convertible orchard heater comprising a cylindrical casing having an aperture therein adjacent the lower end for receiving the wick tube of a lamp and having a plurality of apertures adjacent its lower edge for admitting air, whereby the casing is adapted to be used in combination with a lamp as an individual tree heater and said casing in addition having a supporting flange extending inwardly therefrom adjacent the lower edge for supporting a grate and having numerous partially punched out discs in its wall portion above said flange whereby said body member may be converted into a heater for burning solid fuel by inserting a grate in position on said flange and knocking out said partially punched discs to form draft apertures in said wall member above said grate.

WILLIAM C. SCHEU.